(12) United States Patent
Choi et al.

(10) Patent No.: US 10,391,567 B2
(45) Date of Patent: Aug. 27, 2019

(54) ROTARY CUTTING TOOL AND CUTTING INSERT THEREFOR

(71) Applicant: TaeguTec, Ltd., Dalseong-gun, Daegu (KR)

(72) Inventors: Chang Hee Choi, Daegu (KR); Chang Gyu Park, Daegu (KR); Su Jin Ryu, Daegu (KR)

(73) Assignee: TaeguTec Ltd., Dalseong-gun, Daegu (KR)

( * ) Notice: Subject to any disclaimer, the term of this patent is extended or adjusted under 35 U.S.C. 154(b) by 126 days.

(21) Appl. No.: 15/529,154

(22) PCT Filed: Dec. 7, 2015

(86) PCT No.: PCT/KR2015/013321
§ 371 (c)(1),
(2) Date: May 24, 2017

(87) PCT Pub. No.: WO2016/089188
PCT Pub. Date: Jun. 9, 2016

(65) Prior Publication Data
US 2017/0368617 A1    Dec. 28, 2017

(30) Foreign Application Priority Data

Dec. 5, 2014 (KR) .................. 10-2014-0174219

(51) Int. Cl.
*B23C 5/20* (2006.01)
*B23B 27/16* (2006.01)
(Continued)

(52) U.S. Cl.
CPC ............ *B23C 5/2273* (2013.01); *B23C 3/305* (2013.01); *B23C 5/08* (2013.01); *B23C 5/207* (2013.01);
(Continued)

(58) Field of Classification Search
CPC .... B23C 5/06; B23C 5/22; B23C 5/20; B23C 5/08; B23C 5/2273; B23C 2210/16;
(Continued)

(56) References Cited

U.S. PATENT DOCUMENTS 4,462,725 A    7/1984  Satran et al.
6,971,823 B2 * 12/2005  Satran ....................... B23C 5/08
                                                                407/101
(Continued)

FOREIGN PATENT DOCUMENTS

JP      2007-210050 A      8/2007
JP      2007245245 A   *   9/2007
WO      WO 2011/126231 A2  10/2011

OTHER PUBLICATIONS

Extended European Search Report dated Jul. 4, 2018, issued in counterpart European application (No. EP 15866089.4).
(Continued)

*Primary Examiner* — Nicole N Ramos
(74) *Attorney, Agent, or Firm* — Womble Bond Dickinson (US) LLP

(57) ABSTRACT

A rotary cutting tool for slotting and a cutting insert replaceably mounted to such a rotary cutting tool. The cutting insert is mounted to an insert pocket of a tool body of the rotary cutting tool and is pressed by an elastic pressure portion provided in the tool body. The cutting insert has an upper surface, a lower surface and four peripheral side surfaces. The top and lower surfaces have an inclined surface pressed by the elastic pressure portion. When the cutting insert is mounted to the insert pocket, the inclined surface of the upper surface is pressed by the elastic pressure portion. The inclined surface is inclined with respect to a cross section of the cutting insert such that the lower surface and two peripheral side surfaces of the cutting insert are contacted (Continued)

with the insert pocket by pressure of the elastic pressure portion.

19 Claims, 14 Drawing Sheets

(51) Int. Cl.
*B23C 5/22* (2006.01)
*B23C 3/30* (2006.01)
*B23C 5/08* (2006.01)

(52) U.S. Cl.
CPC .... *B23C 5/2247* (2013.01); *B23C 2200/0416* (2013.01); *B23C 2200/0433* (2013.01); *B23C 2200/081* (2013.01); *B23C 2200/086* (2013.01); *B23C 2210/161* (2013.01); *B23C 2210/168* (2013.01); *B23C 2210/244* (2013.01); *B23C 2210/287* (2013.01); *B23C 2270/06* (2013.01)

(58) Field of Classification Search
CPC ........ B23C 2210/161; B23C 2210/244; B23C 2210/168; B23C 2210/287; B23C 2200/0416; B23C 2200/0433; B23C 2200/081; B23C 2200/086; B23C 2270/06; B23B 2205/02
See application file for complete search history.

(56) References Cited

U.S. PATENT DOCUMENTS

| | | |
|---|---|---|
| 2005/0117981 A1 | 6/2005 | Satran et al. |
| 2007/0256287 A1 | 11/2007 | Kocherovsky et al. |
| 2009/0162155 A1 | 6/2009 | Wermeister |
| 2009/0285645 A1 | 11/2009 | Hecht |
| 2011/0097165 A1* | 4/2011 | Choi ................... B23C 5/08 407/46 |
| 2011/0274506 A1 | 11/2011 | Kakai |
| 2013/0202372 A1 | 8/2013 | Hecht |
| 2014/0133925 A1* | 5/2014 | Athad ................... B23C 5/08 407/40 |
| 2015/0117970 A1 | 4/2015 | Daub |

OTHER PUBLICATIONS

International Search Report dated Mar. 7, 2016 issued in counterpart International (PCT) Application (No. PCT/KR2015/013321).
Written Opinion dated Mar. 7, 2016 issued in counterpart International (PCT) Application (No. PCT/KR2015/013321).

* cited by examiner (PRIOR ART)

ROTARY CUTTING TOOL AND CUTTING INSERT THEREFOR

RELATED APPLICATIONS

This is a 35 USC 371 U.S. National Phase of International Application No. PCT/KR2015/013321, filed 2015 Dec. 7 and published as WO 2016/089188A1 on Jun. 9, 2016, which claims priority to Korean application no. 10-2014-0174219, filed 2014 Dec. 5. The contents of the aforementioned applications are incorporated by reference in their entirety.

TECHNICAL FIELD

The present invention relates to a rotary cutting tool used for slotting a workpiece and a cutting insert mounted to said rotary cutting tool.

BACKGROUND ART

A rotary cutting tool such as a milling cutter cuts a workpiece while being rotated. An example of such rotary cutting tool includes a plane milling cutter or a side milling cutter, which is configured to form a slot in a workpiece. The side milling cutter is mainly used for forming long and deep slots in the workpiece.

By way of example, as shown in FIG. 1, the side milling cutter of the prior art has a disk-shaped tool body 10. The tool body 10 has a plurality of insert pockets 11 shaped so as to receive a cutting insert 12. The insert pockets 11 are arranged along a circumferential periphery of the tool body 10. The cutting insert 12 is mounted to each of the insert pockets 11 by means of a clamping screw 13.

As one example of a rotary cutting tool such as a side milling cutter, International Application Publication No. WO 2005/053888 A1 discloses a rotary slot milling cutter.

DISCLOSURE OF INVENTION

Technical Problem

In the prior art side milling cutter, an insert pocket of a tool body and a cutting insert are respectively provided with fixing elements, which have a complementary shape and configured to engage with each other. For example, the insert pocket of the tool body is provided with a projection portion, while the cutting insert is provided with a recess portion corresponding to the projection portion of the insert pocket. Further, the insert pocket and the cutting insert are formed with a hole to which a clamping screw is coupled. Thus, the cutting insert is fitted to the insert pocket through an engagement between the recess portion and the projection portion, and is clamped to the insert pocket by the clamping screw.

The tool body and the cutting insert of the side milling cutter have a relatively thin thickness. Since the fixing elements and the hole for the clamping screw are formed in the insert pocket of the thin tool body and the thin insert pocket, the tool body and the insert pocket are structurally weak and thus may become damaged or broken during a cutting operation on the workpiece. Further, the insert pocket of the tool body and the cutting insert have a complicated shape due to the fixing elements and the hole, thus making it difficult to manufacture the tool body and the cutting insert.

Moreover, according to the side milling cutter of the prior art, the cutting insert is clamped to the insert pocket by the clamping screw, which is fastened to the hole in the axial direction of the tool body. Thus, when a plurality of side milling cutters are arranged on a single shaft and are used as a gang cutter, it is difficult to fasten or unfasten the clamping screw due to the adjacent same-sized side milling cutters. As such, to replace the cutting insert having a worn-out cutting edge, the gang cutter must be disassembled.

The present invention is directed to solving the aforementioned defects of the prior art. The present invention provides a rotary cutting tool wherein a cutting insert can be stably mounted to an insert pocket without using a clamping screw fastened to the insert pocket through the cutting insert, and wherein the cutting insert can be easily replaced in a radial direction of a tool body. The present invention also provides a cutting insert mounted to such rotary cutting tool.

Solution to Problem

One aspect of the present invention provides a cutting insert, which is replaceably mounted to an insert pocket provided in a tool body of a rotary cutting tool and is pressed by an elastic pressure portion provided in the tool body. In an exemplary embodiment, the cutting insert comprises an upper surface, a lower surface, and first to fourth peripheral side surfaces extending between the upper surface and the lower surface. The first and third peripheral side surfaces are opposite to each other, while the second and fourth peripheral side surfaces are opposite to each other. Each of the upper surface and the lower surface includes an inclined surface pressed by the elastic pressure portion. The inclined surface is inclined with respect to a cross section of the cutting insert such that the first peripheral side surface, the second peripheral side surface and the lower surface are contacted with the insert pocket by a pressure of the elastic pressure portion.

In an embodiment, when the second peripheral side surface is positioned in a YZ-plane of an XYZ-coordinate system and a vertex, which meets the first peripheral side surface and the lower surface among four vertexes of the second peripheral side surface, is positioned at the origin of the XYZ-coordinate system, the inclined surface is located in a plane defined by three points of an X-axis, a Y-axis and a Z-axis in the XYZ-coordinate system. The three points have coordinates of $P(x, 0, 0)$, $Q(0, y, 0)$ and $R(0, 0, z)$, respectively, wherein x, y and z have a positive value.

In an embodiment, the upper surface includes first and second protrusion portions, which are symmetrically opposite to each other in a direction orthogonal to a central axis passing through centers of the second and fourth peripheral side surfaces. The lower surface includes third and fourth protrusion portions, which are symmetrically opposite to each other in the direction orthogonal to the central axis. Each of the first to fourth protrusion portions includes a protrusion surface and a contact side surface slantly connecting with the protrusion surface. The inclined surface is formed at the contact side surface of the first protrusion portion that is located in a radially inward direction of the tool body among the first and second protrusion portions when the cutting insert is mounted to the insert pocket.

In an embodiment, the cutting insert has a rotationally symmetrical shape, wherein the cutting insert is rotated around the central axis.

In an embodiment, the cutting insert includes a cutting edge formed at each of the edges between the upper surface and the first peripheral side surface, between the upper surface and the third peripheral side surface, between the lower surface and the first peripheral side surface, and between the lower surface and the third peripheral side surface.

In an embodiment, when viewing the first peripheral side surface or the third peripheral side surface of the cutting insert from side, the cutting edge of the upper surface is inclined downward from the fourth peripheral side surface toward the second peripheral side surface and the cutting edge of the lower surface is inclined upward from the fourth peripheral side surface toward the second peripheral side surface.

In an embodiment, the protrusion surface includes a first protrusion surface making an acute angle with the second peripheral side surface.

In an embodiment, each of the first and third peripheral side surfaces makes an obtuse angle with the second peripheral side surface.

Another aspect of the present invention provides a rotary cutting tool having a tool body including a plurality of cutting portions. In an exemplary embodiment of the rotary cutting tool, each of the cutting portions comprises: the above-described cutting insert; an insert pocket on which the cutting insert is mounted; and an elastic pressure portion adjoining the insert pocket. The tool body comprises a pair of circular surfaces opposite in a direction of a rotation axis and a peripheral surface extending between the pair of the circular surfaces. The insert pocket comprises: a top wall including a projection portion; a bottom wall opposite to and spaced from the top wall; and first and second support walls located between the top and bottom walls. The top wall is configured to be bendable by the elastic pressure portion. The first support wall faces in a radially outward direction of the tool body. The second support wall faces in an axial direction of the tool body. The projection portion of the top wall includes an inward inclined surface, which presses the inclined surface of the cutting insert such that when the cutting insert is mounted to the insert pocket, the first peripheral side surface, the second peripheral side surface and the lower surface are contacted with the first support wall, the second support wall and the bottom wall, respectively.

In an embodiment, a lower portion of the elastic pressure portion forms the top wall. The elastic pressure portion comprises: a threaded hole extending from the peripheral surface of the tool body toward an inside of the tool body; a slot extending at the peripheral surface of the tool body from an entrance of the threaded hole toward the inside of the tool body and being inclined with the threaded hole; and an adjustment screw coupled to the threaded hole to expand the slot.

In an embodiment, the elastic pressure portion comprises: a wedge hole extending from the peripheral surface of the tool body toward an inside of the tool body; a slot extending at the peripheral surface of the tool body from an entrance of the wedge hole toward the inside of the tool body and being inclined with respect to the wedge hole; a wedge block inserted to the wedge hole; and an adjustment screw fitted to the wedge block and coupled to the wedge hole to expand the slot.

In an embodiment, the tool body includes a slit extending from the insert pocket toward the inside of the tool body, wherein the slit is inclined with respect to the slot.

In an embodiment, the bottom wall and the second support wall make an acute angle therebetween in the insert pocket.

In an embodiment, the first support wall and the second support wall make an obtuse angle therebetween in the insert pocket.

In an embodiment, each of the cutting portions has a clearance gap of 0.1 mm to 0.2 mm between the top wall of the insert pocket and the upper surface of the cutting insert.

In an embodiment, the tool body has a disk shape formed with a shaft hole having a pair of key ways at a center of the disk shape.

In an embodiment, the plurality of cutting portions comprises left-handed cutting portions and right-handed cutting portions, which are alternately arranged along a circumferential periphery of the tool body.

In an embodiment, the rotary cutting tool is a side milling cutter for forming a slot in a workpiece.

Advantageous Effects of Invention

According to the embodiments, the cutting insert and the insert pocket of the tool body do not have the hole for a clamping screw for clamping the cutting insert to the insert pocket. Thus, the tool body and the cutting insert have a strong structure and are not damaged or broken during a cutting operation on a workpiece. Further, the insert pocket of the tool body and the cutting insert have a simple shape, thereby making it easier to manufacture the insert pocket and the cutting insert.

When the cutting insert is mounted to the insert pocket, the cutting insert is pressed by the top wall of the insert pocket. The cutting insert is pressed by the top wall of the insert pocket such that the lower surface and the two peripheral side surfaces are simultaneously contacted with the bottom wall and the both support walls of the insert pocket corresponding thereto. Since the cutting insert is contacted with the top, bottom and both support walls of the insert pocket and is supported by the insert pocket, the cutting insert is stably mounted to the insert pocket.

The cutting insert is mounted to or dismounted from the insert pocket in the radial direction of the tool body. Thus, when a plurality of rotary cutting tools are combined together and are used as a gang cutter, the cutting insert can be easily dismounted from the tool body without disassembling the gang cutter.

MODE FOR THE INVENTION

Descriptions are made as to embodiments of a rotary cutting tool and a cutting insert mounted to said rotary cutting tool with reference to the accompanying drawings. In the accompanying drawings, like or corresponding elements or components are denoted by the same reference symbol.

Figure 1:
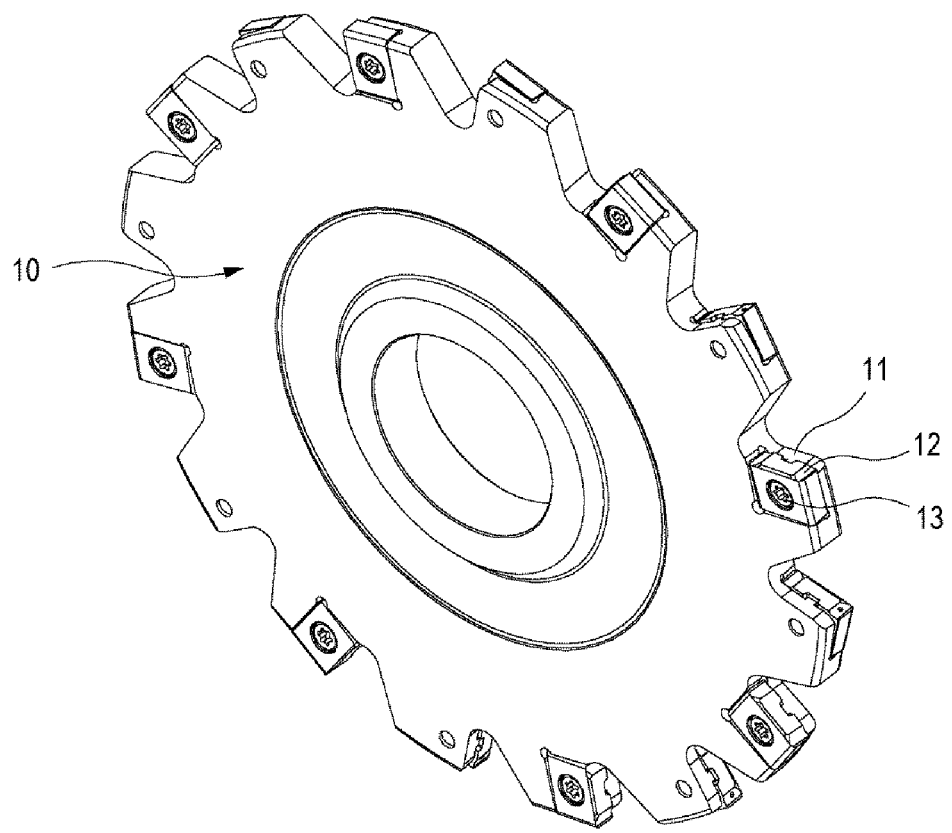
FIG. 1 is a perspective view showing a side milling cutter of the prior art.
Figure 2:
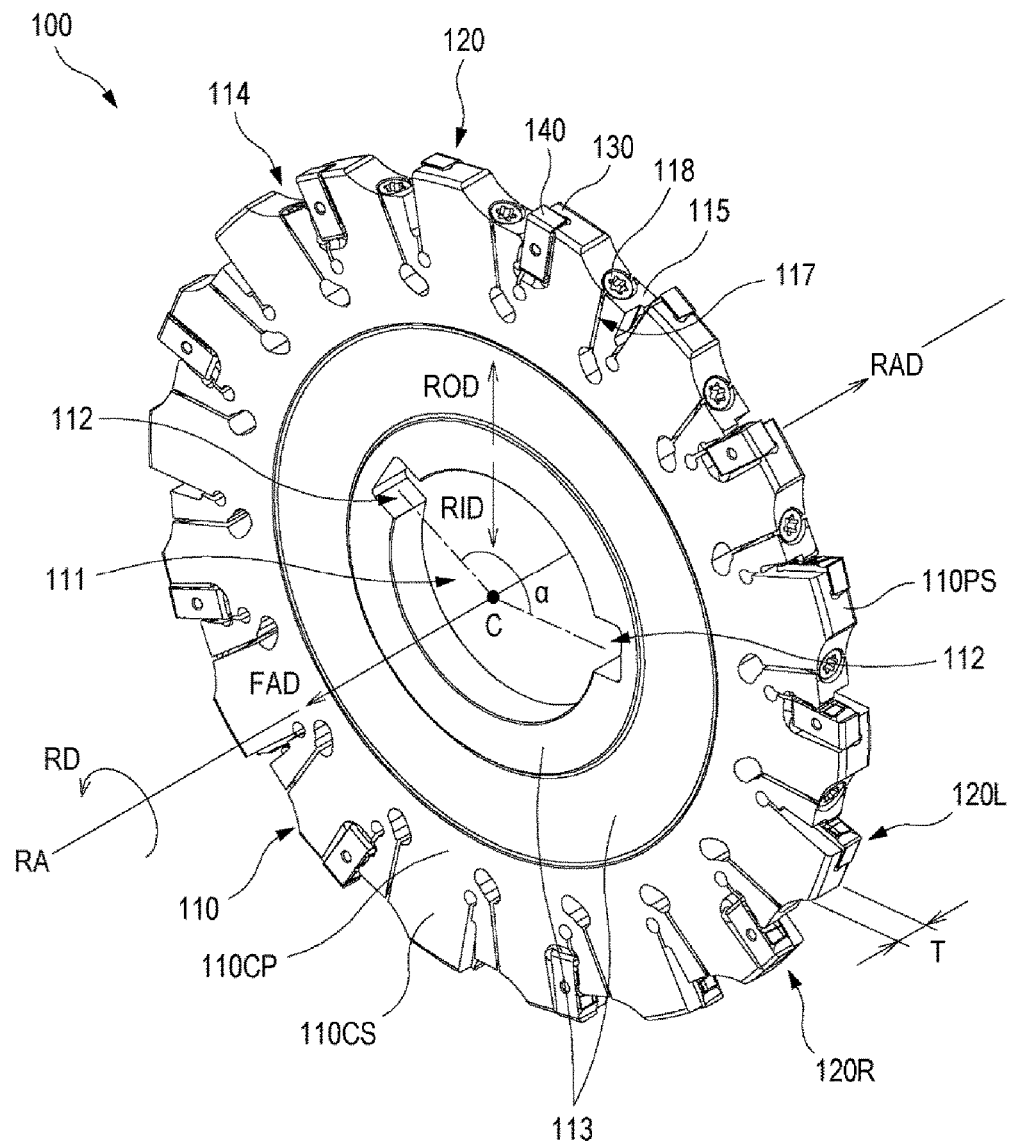
FIG. 2 is a perspective view showing a rotary cutting tool according to an embodiment of the present invention.

Descriptions are made as to a rotary cutting tool according to one embodiment with reference to FIG. 2. The rotary cutting tool 100 has a rotation axis RA by which a rotation direction RD is defined. In the rotation axis RA, an arrow FAD indicates a forward axial direction of the rotary cutting tool 100, while an arrow RAD indicates a rearward axial direction of the rotary cutting tool 100. Further, in FIG. 2, an arrow ROD indicates a radially outward direction of the rotary cutting tool 100, while an arrow RID indicates a radially inward direction of the rotary cutting tool 100. The radially inward direction RID of the rotary cutting tool 100 indicates a direction heading to a center C of the rotary cutting tool 100, while the radially outward direction ROD indicates a direction opposite to the radially inward direction RID.

As shown in FIG. 2, the rotary cutting tool 100 includes a tool body 110 to which a cutting insert 140 is mounted. The tool body 110 has a disk shape. Such a tool body 110 has a pair of circular surfaces 110CS, which are opposite in the direction of the rotation axis RA, and a peripheral surface 110PS that extends between the pair of circular surfaces 110CS. The tool body 110 has a relatively thin thickness T. Thus, the tool body 110 is capable of forming a slot, which has a width corresponding to the thickness T of the tool body 110, by cutting a workpiece while being rotated. That is, the rotary cutting tool 100 according to one embodiment may be used as a side milling cutter for forming a slot in a workpiece.

The tool body 110 has a shaft hole 111, which is perforated at a center of the tool body 110. When the rotary cutting tool 100 is mounted to a machine tool, a shaft of a machine tool (e.g., a spindle or arbor of a milling machine) is fitted to the shaft hole 111. Further, the tool body 110 has a pair of key ways 112 formed in a circumference of the shaft hole 111. Thus, when the rotary cutting tool 100 is mounted to the machine tool, keys are fitted to the pair of key ways 112, respectively, thus preventing rotation slip between the shaft of the machine tool and the tool body 110. In one embodiment, the pair of key ways 112 are positioned in the shaft hole 111 with an included angle α of 120° relative to the center C of the rotary cutting tool 100, and tangential keys may be fitted to the respective key ways 112. In some embodiment, the pair of key ways 112 are positioned in the shaft hole 111 with an included angle α of 90° relative to the center C of the rotary cutting tool 100, and kennedy keys may be fitted to the respective key ways 112.

The tool body 110 includes at least one stepped surface 113 at each of the pair of the circular surfaces 110CS. Thus, the thickness T between the pair of circular surfaces 110CS stepwise decreases in the radially inward direction RID of the tool body 110. In this embodiment, when viewing the tool body 110 from the front or the rear, the stepped surface 113 has a ring shape. However, it should be expressly noted herein that the shape of the stepped surface 113 is not limited thereto. By forming the stepped surface 113 in the tool body 110, the weight of the tool body 110 can be reduced. Further, a circumferential peripheral portion 110CP of the tool body 110 has a relatively thick thickness, thus preventing vibration of the tool body 110 that is rotated during a cutting operation on a workpiece.

The tool body 110 has a plurality of recesses 114, which are formed in the circumferential peripheral portion 110CP with the peripheral surface 110PS. The recess 114 is formed concavely in the radially inward direction RID of the tool body 110. The cutting insert 140 can be easily mounted to or dismounted from the tool body 110 through the recess 114. Further, chips generated during the cutting operation on a workpiece can be smoothly discharged through the recess 114.

The tool body 110 has a plurality of cutting portions 120 for cutting a workpiece. Each of the plurality of cutting portions 120 includes an insert pocket 130, which is formed in the tool body 110, and a cutting insert 140 that is replaceably mounted to the insert pocket 130. At least a portion of the insert pocket 130 is opened toward the recess 114. One insert pocket 130 and one recess 114 corresponding thereto make a pair, and a plurality of the pairs of the insert pocket 130 and the recess 114 are arranged along the periphery of the tool body 110 at equal spacing.

In one embodiment, a plurality of the cutting portions 120 comprise right-handed cutting portions 120R and left-handed cutting portions 120L which are alternately arranged along the periphery of the tool body 110. In FIG. 2, the right-handed cutting portion 120R has the insert pocket opened in the forward axial direction FAD, while the left-handed cutting portion 120L has the insert pocket opened in the rearward axial direction RAD. Thus, a single double-sided cutting insert can be mounted to the insert pocket of the right-handed cutting portion 120R or the insert pocket of the left-handed cutting portion 120L. That is, all of the cutting edges of a single double-sided cutting insert can be used for cutting a workpiece. As such, the cutting insert mounted to the rotary cutting tool 100 is efficiently used and its service life increases.

The insert pocket 130, which is provided in the tool body of the rotary cutting tool according to one embodiment, is described with reference to FIGS. 3 to 5. The insert pocket 130 is configured to receive the cutting insert 140 having an approximately rectangular parallelepiped shape. The insert pocket 130 includes a top wall 131, a bottom wall 132, a first support wall 133 and a second support wall 134.

The top wall 131 includes a projection portion 135 projecting toward the bottom wall 132. The bottom wall 132 is opposite to the top wall 131. The cutting insert 140 is seated on the bottom wall 132. The bottom wall 132 extends in the radially outward direction ROD of the tool body 110 and is longer than the top wall 131. The first support wall 133 is located between the top wall 131 and the bottom wall 132 and faces in the radially outward direction ROD of the tool body 110. The second support wall 134 is located between the top wall 131 and the bottom wall 132, and faces in the direction of the rotation axis RA of the tool body 110. In the insert pocket 130 of the right-handed cutting portion 120R, the second support wall 134 faces in the forward axial direction FAD of the tool body 110. In the insert pocket 130 of the left-handed cutting portion 120L, the second support wall 134 faces in the rearward axial direction RAD of the tool body 110.

The insert pocket 130 is formed with relief grooves 137A, 137B, 137C, 137D and 137E by end milling or drilling. The relief grooves 137A, 137B, 137C, 137D and 137E prevent the cutting edges of the cutting insert 140 from being damaged and allow the cutting insert 140 to be precisely positioned in the insert pocket 130. The relief groove 137A between the circular surface 110CS and the bottom wall 132 is located lower than the bottom wall 132. In some embodiment, the cutting insert 140 may not protrude from the insert pocket 130 in the direction of the rotation axis RA. In such an embodiment, an intersection portion between the circular surface 110CS and the relief groove 137A may be higher than the bottom wall 132. In such an embodiment, the aforementioned intersection portion can prevent the cutting insert 140 from escaping from the insert pocket 130 in the direction of the rotation axis RA (in FIG. 3, in the forward axial direction FAD).

The bottom wall 132, the first support wall 133 and the second support wall 134 has a fixed position in the insert pocket 130, while the top wall 131 has a position variable toward the insert pocket 130 such that the top wall 131 can clamp the cutting insert 140 fitted to the insert pocket 130. In one embodiment, the top wall 131 is spaced upward from the first support wall 133 and the second support wall 134. The bottom wall 132 and a top surface 134T of the second support wall 134 are located below the top wall 131. A length of the top wall 131 in the radially outward direction ROD of the tool body 110 is shorter than respective lengths of the bottom wall 132 and the top surface 134T of the second support wall 134 in the radially outward direction ROD of the tool body 110. Thus, an inward portion of the bottom wall 132 and an inward portion of the top surface 134T of the second support wall 134 are located below the top wall 131. That is, the end of the top wall 131 in the radially outward direction ROD is located radially inside the end of the insert pocket 130 in the radially outward direction ROD.

The projection portion 135 projects from the end portion of the top wall 131 in the radially outward direction ROD such that the projection portion 135 can press the cutting insert 140 with a sufficient force even if the top wall 131 is slightly pushed downward. In this embodiment, the projection portion 135 projects from the end portion of the top wall 131 in the radially outward direction ROD toward the bottom wall 132. The projection portion 135 includes an inward inclined surface 136, which is inclined toward the bottom wall 132 in the radially inward direction RID of the tool body 110. When the cutting insert 140 is mounted to the insert pocket 130, the projection portion 135 contacts the cutting insert 140 through the inward inclined surface 136. Further, the cutting insert 140, which is pressed by contact with the projection portion 135, is pushed toward the inside of the insert pocket 130, i.e. toward the bottom wall 132, the first support wall 133 and the second support wall 134. That is, when the cutting insert 140 is mounted to the insert pocket 130, the inward inclined surface 136 of the projection portion 135 contacts the upper surface of the cutting insert 140, thus bringing the lower surface of the cutting insert 140 into close contact with the bottom wall 132 and bringing two peripheral side surfaces of the cutting insert 140 into close contact with the first support wall 133 and the second support wall 134, respectively. The cutting insert 140, which has the pressure-applied upper surface as described above, is supported by the insert pocket 130 as being contacted with the top wall 131, the bottom wall 132, the first support wall 133 and the second support wall 134.

In the tool body 110, an upper portion, which is located on the top wall 131 of the insert pocket 130, is configured such that the top wall 131 is elastically pushed toward the bottom wall 132 of the insert pocket 130. Hereinafter, said upper portion is referred to as an elastic pressure portion 115. In one embodiment, the elastic pressure portion 115 comprises a threaded hole 116 and a slot 117, which are formed in the tool body 110, and an adjustment screw 118 that is coupled to the threaded hole 116.

The threaded hole 116 is opened at the peripheral surface 110PS in the recess 114 of the tool body 110. The threaded hole 116 extends toward the inside of the tool body 110 approximately parallel with the bottom wall 132 of the insert pocket 130. At the peripheral surface 110PS in the recess 114, the slot 117 extends from an entrance of the threaded hole 116 toward the inside of the tool body 110. The slot 117 is formed through the tool body 110. The slot 117 is inclined with respect to the threaded hole 116 (see FIG. 5). The slot 117 has, at its end located toward the inside of the tool body 110, a slot hole 117H that is perforated through the tool body 110 in an approximately elliptical shape. In one embodiment, the threaded hole 116 and the slot 117 are located at the circumferential peripheral portion 110CP of the tool body 110 where the stepped surface 113 is not formed.

Figure 5:
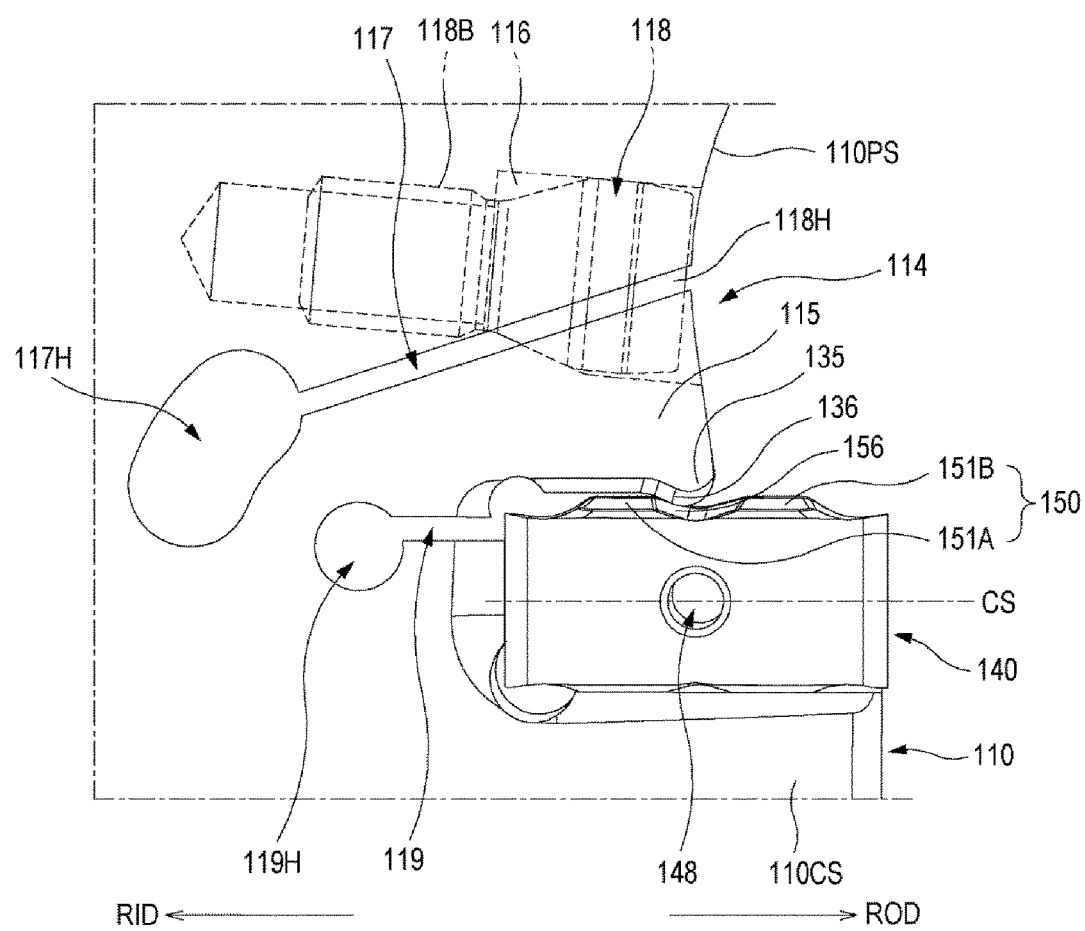
FIG. 5 is a front view showing a portion of the rotary cutting tool according to one embodiment of the present invention, showing a cutting insert and the insert pocket of a tool body to which the cutting insert is mounted.

As shown in FIG. 5, if the adjustment screw 118 is coupled and then fastened to the threaded hole 116, which is opened toward the outside of the tool body 110, then the slot 117 expands due to a head portion 118H that has a diameter larger than that of a body portion 118B of the adjustment screw 118. Thus, the elastic pressure portion 115 located below the slot 117 is pushed downward and bends relative the slot hole 117H. In one embodiment, the tool body 110 is formed with a slit 119 extending from the insert pocket 130 toward the inside of the tool body 110. Due to the slit 119, the elastic pressure portion 115 can be easily pushed while fastening of the adjustment screw 118. In one embodiment, the slit 119 extends approximately in the radially inward direction RID of the tool body 110 and is inclined with respect to the slot 117. The slit 119 is formed through the tool body 110. The slit 119 has, at its end located toward the inside of the tool body 110, a slit hole 119H that is perforated through the tool body 110 in an approximately circular shape. In one embodiment, the slit hole 119H has a size smaller than the slot hole 117H and is located closer to the peripheral surface 110PS of the tool body 110 than the slot hole 117H.

Figure 6:
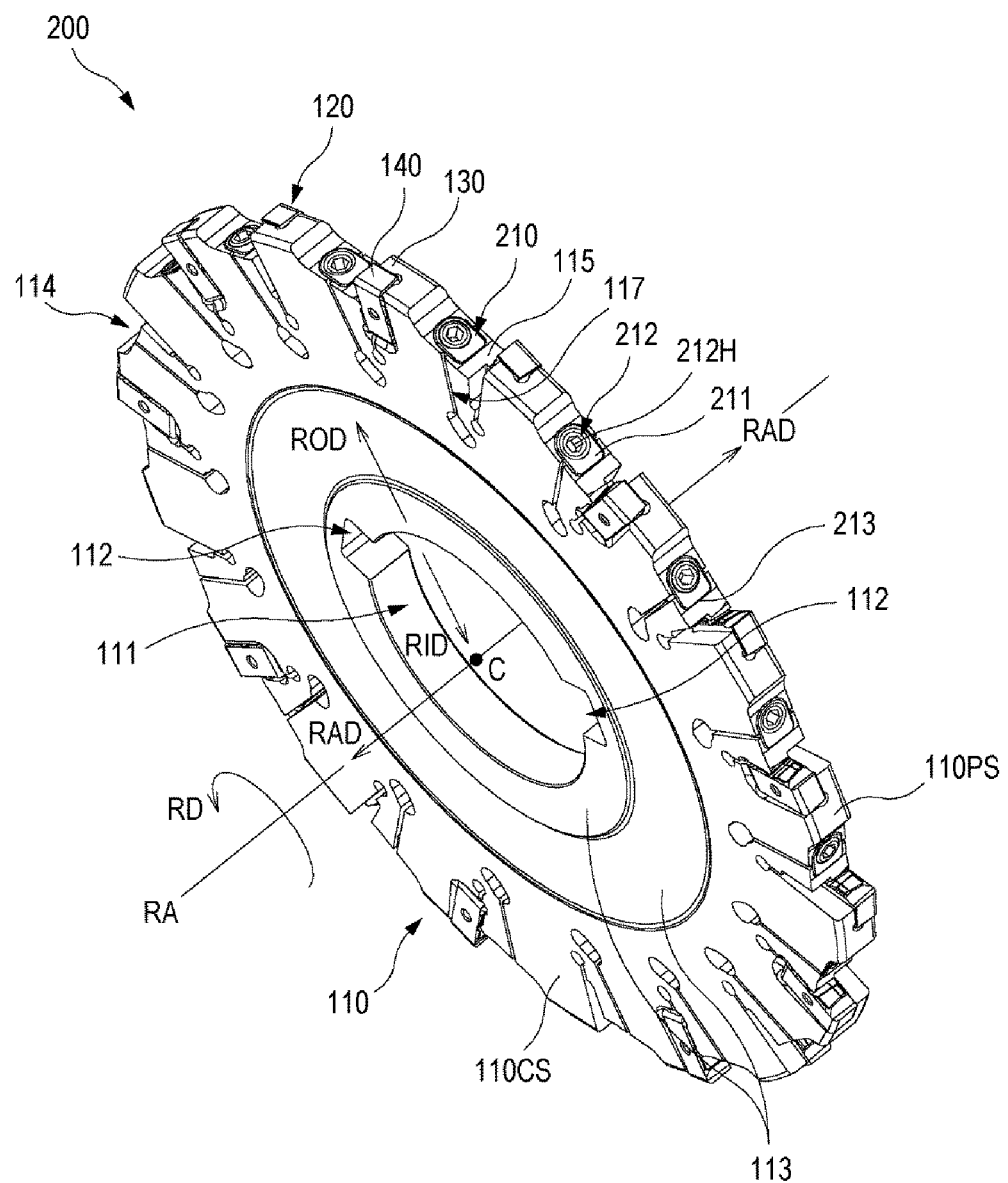
FIG. 6 is a perspective view showing a rotary cutting tool according to another embodiment of the present invention.
Figure 7:
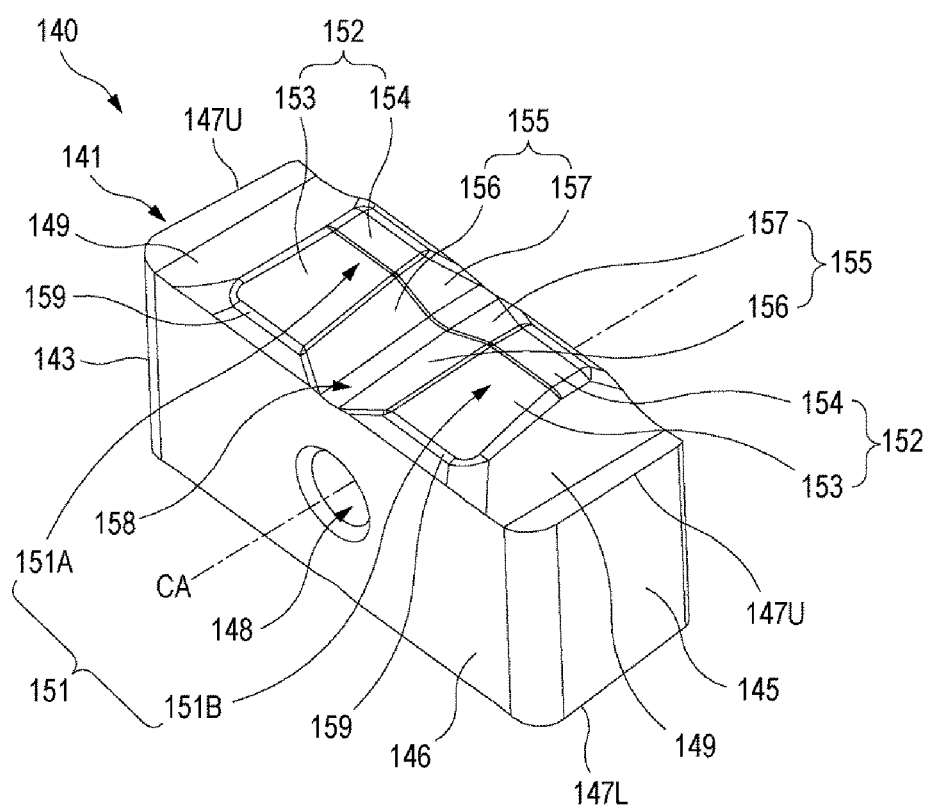
FIG. 7 is a perspective view showing a cutting insert according to one embodiment of the present invention.
Figure 8:
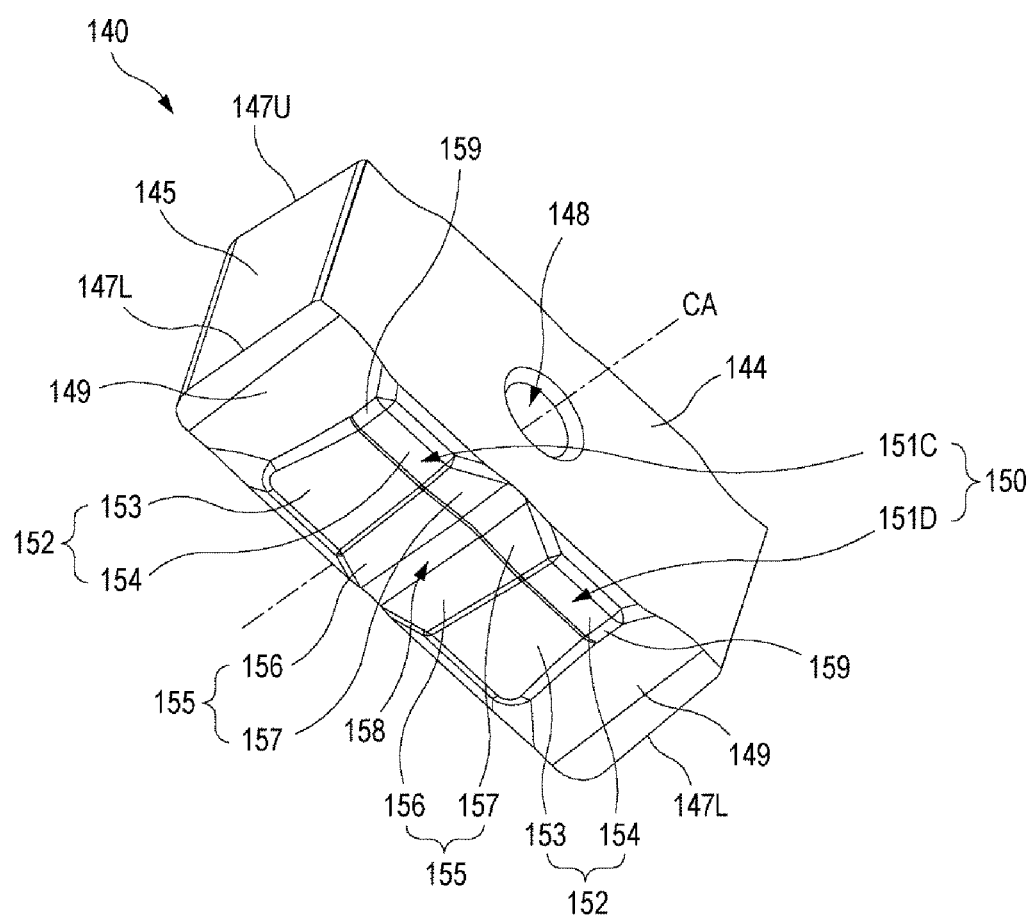
FIG. 8 is a perspective view showing the cutting insert of FIG. 7 viewed in another direction.

This embodiment employs the adjustment screw 118, which is threadedly coupled to the threaded hole 116, as a means for pushing the elastic pressure portion 115. However, said pushing means is not limited to the adjustment screw. A rotary cutting tool 200 according to another embodiment shown in FIG. 6 includes a wedge 210 as said pushing means. The wedge 210 is removably fitted to a wedge hole 213 formed in the tool body 110. The wedge 210 includes a wedge block 211 and an adjustment screw 212. The wedge block 211 is inserted to the wedge hole 213 and the adjustment screw 212 is coupled to the wedge hole 213 through the wedge block 211. The adjustment screw 212 has a head portion 212H, which engages the wedge block 211 when the adjustment screw 212 is fitted to the wedge block 211, and a threaded portion (not shown) that extends from the head portion 212H and is threadedly coupled to the wedge hole 213 through the wedge block 211. The head portion 212H of the adjustment screw 212 is formed with a hexagonal hole to which a hexagonal wrench is inserted. The wedge block 211 has a tapering shape and includes a portion, which expands the wedge hole 213 when the wedge block 211 is pushed to the wedge hole 213. If the adjustment screw 212 is fitted to the wedge block 211 and is then fastened to the wedge hole 213 to be threadedly coupled to the wedge hole 213, then the head portion 212H of the adjustment screw 212 pushes the wedge block 211 into the wedge hole 213. Further, the slot 117 expands due to the portion of the wedge block 211, which expands the wedge hole 213, and the elastic pressure portion 115 located below the slot 117 is pushed downward. Similar to the threaded hole 116, the wedge hole 213 includes a threaded portion, to which the threaded portion of the adjustment screw 212 is threadedly coupled, in the radially inward direction RID of the tool body 110, and a receiving portion, which receives the wedge block 211, in the radially outward direction ROD of the tool body 110. The slot 117 according to one embodiment expands due to the head portion 118H of the adjustment screw 118, while the slot 117 according to another embodiment expands due to the wedge block 211 that is pushed into the inside of the tool body 110 by the head portion 212H of the adjustment screw 212.

As described above, the rotary cutting tool 100, 200 employs a screw clamp type or a wedge clamp type as the means for pushing the elastic pressure portion 115, i.e., the means for expanding the slot 117.

Descriptions are made as to one embodiment of the cutting insert, which is mounted to the above-described rotary cutting tool 100, 200 with reference to FIGS. 7 to 13. As shown in FIGS. 7 to 11, the cutting insert 140 according to one embodiment comprises an upper surface 141, a lower surface 142 and a plurality of peripheral side surfaces extending between the upper surface 141 and the lower surface 142. The upper surface 141 and the lower surface 142 of the cutting insert 140 are opposite to each other. Each of the upper surface 141 and the lower surface 142 is provided with a protrusion portion 150. In one embodiment, the cutting insert 140 has a shape of an approximately rectangular parallelepiped. Thus, the cutting insert 140 has four peripheral side surfaces, i.e., first to fourth peripheral side surfaces 143, 144, 145 and 146. The first peripheral side surface 143 and the third peripheral side surface 145 are opposite to each other, while the second peripheral side surface 144 and the fourth peripheral side surface 146 are opposite to each other. The first peripheral side surface 143 and the third peripheral side surface 145 have a surface area smaller than the second peripheral side surface 144 and the fourth peripheral side surface 146.

Figure 9:
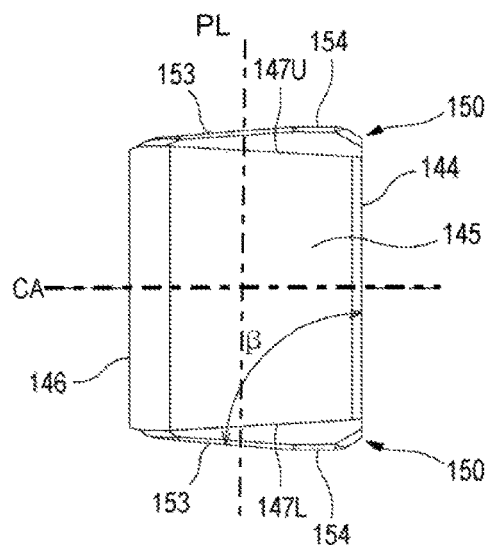
FIG. 9 is a side view of the cutting insert shown in FIG. 7.
Figure 10:
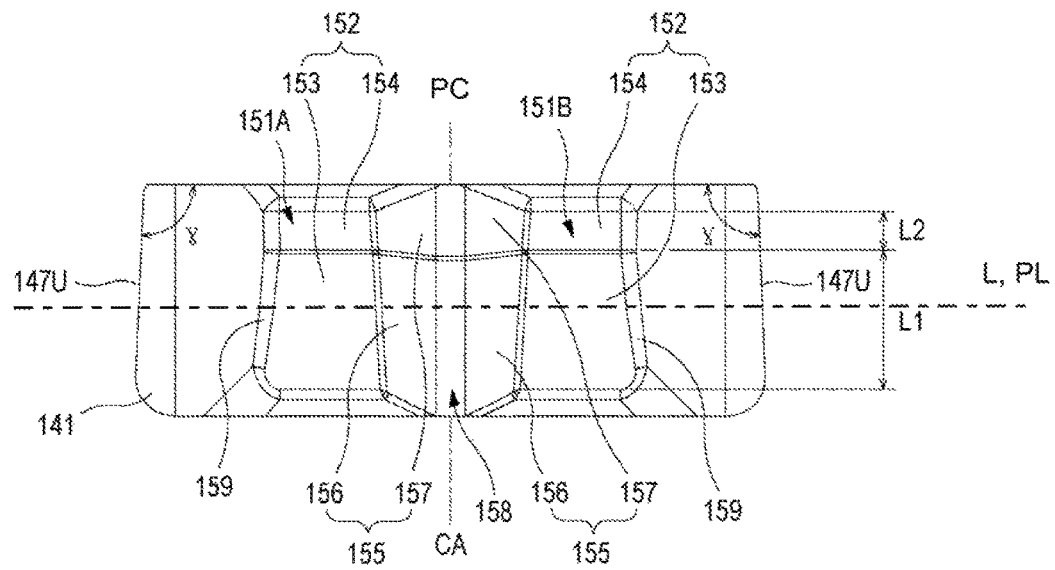
FIG. 10 is a top view of the cutting insert shown in FIG. 7.

The cutting insert 140 is a double-sided indexable cutting insert. The cutting insert 140 has a plurality of cutting edges 147U, 147L, which are formed at edges between the upper surface 141 and the first peripheral side surface 143, between the upper surface 141 and the third peripheral side surface 145, between the lower surface 142 and the first peripheral side surface 143, and between the lower surface 142 and the third peripheral side surface 145. That is, each of the upper surface 141 and the lower surface 142 is provided with two cutting edges 147U, 147L, and thus, the cutting insert 140 has four cutting edges 147U, 147L in total. The cutting insert 140 has a rotationally symmetrical shape that is rotationally symmetrical when rotating the cutting insert 140 by 180° around a central axis CA extending through a center of the second peripheral side surface 144 and a center of the fourth peripheral side surface 146. Thus, all of the four cutting edges 147U, 147L can be used for a cutting operation. Further, to ease fabrication of the cutting insert 140, the cutting insert 140 has a bore 148 passing through the centers of the second peripheral side surface 144 and the fourth peripheral side surface 146. As seen in FIGS. 9 and 10, the central axis CA lies on a central insert plane PC which passes through the upper and lower surfaces 141, 142 and also the second and fourth peripheral side surfaces 144, 146. A longitudinal axis L lies on a longitudinal insert plane PL passing through the upper and lower surfaces 141, 142 and also first and second peripheral side surfaces 143, 145, the longitudinal insert plane PL being perpendicular to the central axis CA and the central insert plane PC. As seen in FIG. 10, the upper surface 141 (and thus also the lower surface 142) has mirror symmetry about the central insert plane PC, but lacks mirror symmetry about the longitudinal insert plane PL.

The cutting insert 140 includes the protrusion portion 150 at each of the upper surface 141 and the lower surface 142. When the cutting insert 140 is mounted to the insert pocket 130 of the tool body 110, the protrusion portion 150 of the upper surface 141 is contacted with the projection portion 135 of the top wall 131 of the insert pocket 130 and the protrusion portion 150 of the lower surface 142 is contacted with the bottom wall 132 of the insert pocket 130. Further, among the peripheral side surfaces 143, 144, 145, 146 of the cutting insert 140, the first peripheral side surface 143 is contacted with the first support wall 133 of the insert pocket 130 and the second peripheral side surface 144 is contacted with the second support wall 134 of the insert pocket 130. Since the cutting insert 140 has a rotationally symmetrical shape, the first peripheral side surface 143 and the third peripheral side surface 145 of the cutting insert 140 may be alternately referred depending upon whether which of them is contacted with the first support wall 133 of the insert pocket 130. That is, when the cutting insert 140 is mounted to the insert pocket 130, the peripheral side surface of the cutting insert 140, which is contacted with the first support wall 133 of the insert pocket 130, is the first peripheral side surface 143 and the opposite peripheral side surface of the cutting insert 140 is the third peripheral side surface 145.

The protrusion portion 150 provided at each of the upper surface 141 and the lower surface 142 comprises a pair of protrusion portions, which are symmetrically opposite to each other in a direction orthogonal to the central axis CA of the cutting insert 140. Hereinafter, a pair of the protrusion portions located at the upper surface 141 are referred to as a first protrusion portion 151A and a second protrusion portion 151B, respectively, while a pair of the protrusion portions located at the lower surface 142 are referred to as a third protrusion portion 151C and a fourth protrusion portion 151D, respectively.

Each of the first protrusion portion 151A and the second protrusion portion 151B has a protrusion surface 152 and a plurality of side surfaces extending between the protrusion surface 152 and the upper surface 141. Further, each of the third protrusion portion 151C and the fourth protrusion portion 151D has a protrusion surface 152 and a plurality of side surfaces extending between the protrusion surface 152 and the lower surface 142. The first to fourth protrusion portions 151A, 151B, 151C and 151D include a contact side surface 155, at which contact is made when the cutting insert 140 is mounted to the insert pocket 130, among the side surfaces. The contact side surface 155 of the first protrusion portion 151A and the contact side surface 155 of the second protrusion portion 151B are opposite to each other. The contact side surface 155 of the third protrusion portion 151C and the contact side surface 155 of the fourth protrusion portion 151D are opposite to each other.

The protrusion surface 152 is an outermost surface of each of the first to fourth protrusion portions 151A, 151B, 151C, 151D. In the upper surface 141, the protrusion surface 152 is an uppermost surface of the first protrusion portion 151A and the second protrusion portion 151B. In the lower surface 142, the protrusion surface 152 is a lowermost surface of the third protrusion portion 151C and the fourth protrusion portion 151D. The protrusion surface 152 comprises a first protrusion surface 153 and a second protrusion surface 154, which extend in the direction of the central axis CA. The first protrusion surface 153 is located adjacent to the fourth peripheral side surface 146 of the cutting insert 140, while the second protrusion surface 154 is located adjacent to the second peripheral side surface 144 of the cutting insert 140.

With respect to an imaginary cross section CS extending through the central axis CA of the cutting insert 140 (see FIG. 5), the first protrusion surface 153 formed in the upper surface 141 is upwardly inclined from the fourth peripheral side surface 146 toward the second peripheral side surface 144. Herein, the cross section CS means a plane bisecting the cutting insert 140 vertically. The second protrusion surface 154 extends from an end of the first protrusion surface 153, which faces toward the second peripheral side surface 144. In one embodiment, the second protrusion surface 154 formed in the upper surface 141 extends approximately parallel with the cross section CS.

Figure 3:
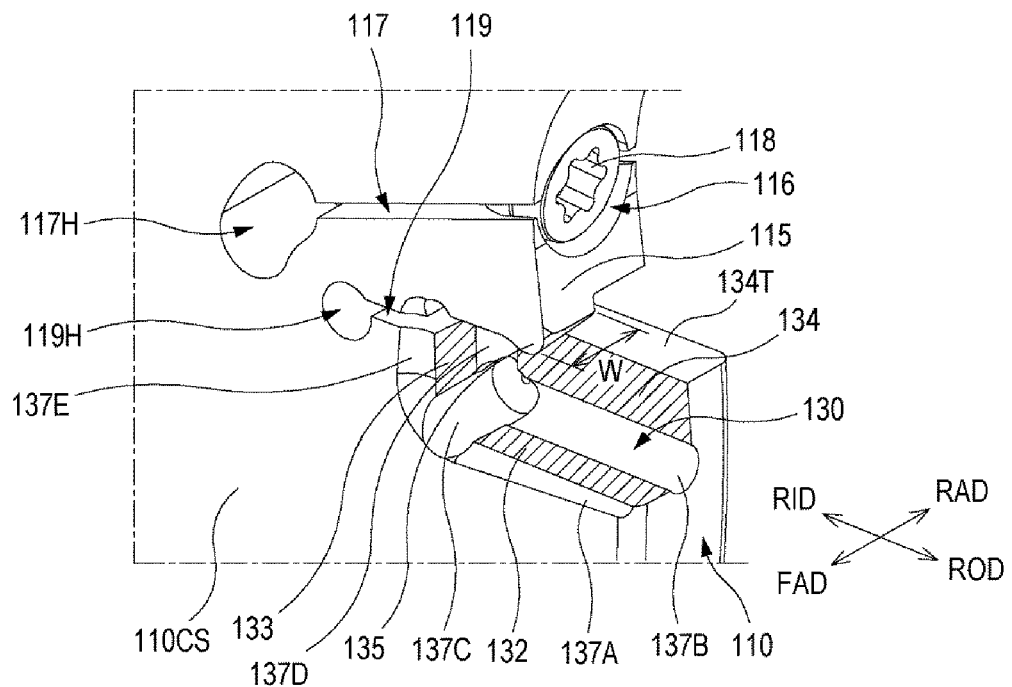
FIG. 3 is a perspective view showing an insert pocket of the rotary cutting tool shown in FIG. 2.
Figure 4:
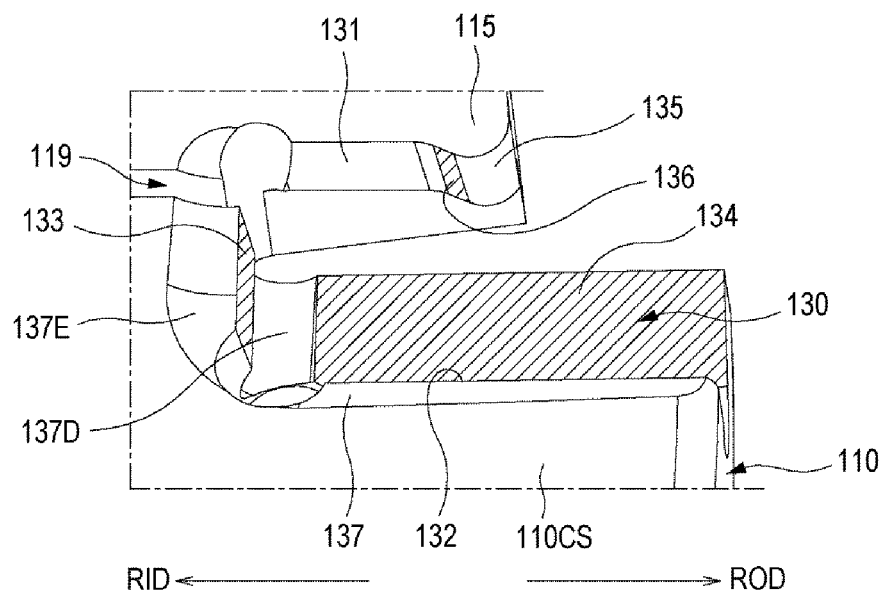
FIG. 4 shows the insert pocket of FIG. 3 viewed in another direction and shows a top wall of the insert pocket.

A length L1 of the first protrusion surface 153 in the direction of the central axis CA and a length L2 of the second protrusion surface 154 in the direction of the central axis CA may be determined depending upon a width W of the projection portion 135 provided in the top wall 131 of the insert pocket 130 (see FIG. 3). The length L1 of the first protrusion surface 153 may be equal to or longer than the width W of the projection portion 135. The length L1 of the first protrusion surface 153 may be longer than the length L2 of the second protrusion surface 154. The first protrusion surface 153 gradually narrows from the fourth peripheral side surface 146 toward the second peripheral side surface 144. Specifically, as shown in FIG. 10, when viewing the cutting insert 140 from the top, the edge of the first protrusion surface 153, which is adjacent to the central axis CA, is gradually away from the central axis CA from the fourth peripheral side surface 146 toward the second peripheral side surface 144.

The contact side surface 155 comprises an inclined surface, which is contacted with the projection portion 135 of the top wall 131 of the insert pocket 130. In this embodiment, the contact side surface 155 comprises a first inclined surface 156, which connects with the first protrusion surface 153, and a second inclined surface 157 that connects with the second protrusion surface 154. As can be seen in, e.g., FIG. 10, the first and second inclined surfaces 156, 157 are inclined towards each other in the direction of the central insert plane PC. The first inclined surface 156 is contacted with the projection portion 135 of the top wall 131 and is pressed by the elastic pressure portion 115. When the cutting insert 140 is mounted to the insert pocket 130, the first protrusion portion 151A, which is located in the radially inward direction RID of the tool body among the first and second protrusion portions 151A and 151B provided in the upper surface 141 of the cutting insert 140, is contacted with the projection portion 135 of the top wall 131 at the first inclined surface 156. In each of the upper surface 141 and the lower surface 142 of the cutting insert 140, the first inclined surface 156 is inclined in both the direction of the central axis CA and the direction orthogonal to the central axis CA. The first inclined surface 156 is inclined with respect to the cross section CS of the cutting insert 140 such that all of the first peripheral side surface 143, the second peripheral side surface 144 and the lower surface 142 of the cutting insert 140 are pressed toward the insert pocket 130 and are contacted with the insert pocket 130 when the first inclined surface 156 is pressed by the elastic pressure portion 115 in the cutting insert 140.

Figure 11:
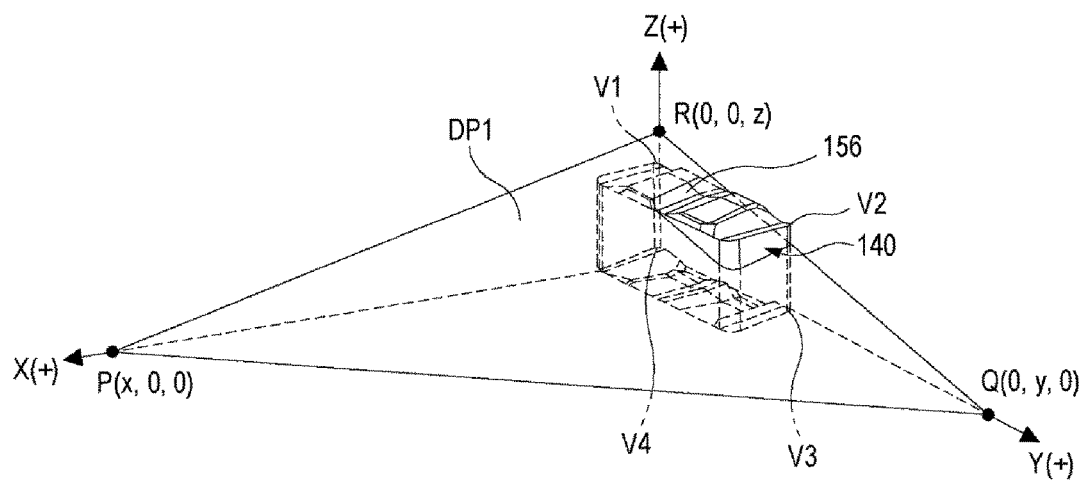
FIG. 11 shows an inclined surface of the cutting insert shown in FIG. 7 by means of an XYZ coordinate system.

Reference is made to FIG. 11 regarding the inclination of the first inclined surface 156. When the second peripheral side surface 144 of the cutting insert 140 is positioned in a YZ-plane of an XYZ-coordinate system and a vertex V4, which meets the first peripheral side surface 143 and the lower surface 142 among four vertexes V1, V2, V3, V4 of the second peripheral side surface 144, is positioned at the origin of the XYZ-coordinate system, the first inclined surface 156 is located in a plane DP1 defined by three points P, Q, R of the X-axis, Y-axis and Z-axis in the XYZ-coordinate system. In this regard, said three points in the XYZ-coordinate system have the coordinates of P(x, 0, 0), Q(0, y, 0) and R(0, 0, z), respectively, wherein x, y and z has a positive value. That is, the first inclined surface 156 is inclined with respect to each of the XY-plane, the YZ-plane and the XZ-plane of the XYZ-coordinate system. Thus, the first inclined surface 156 has a normal direction inclined with respect to each of the X-axis, the Y-axis and the Z-axis.

In one embodiment, as to the protrusion surface 152 of the first to fourth protrusion portions 151A, 151B, 151C, 151D, an edge 159 between the protrusion surface 152 and the side surface of the protrusion portion 150 is chamfered, thus preventing stress concentration caused by a clamping force generated when mounting the cutting insert 140 to the insert pocket 130 or a cutting force generated during the cutting operation on a workpiece.

The entirety of the upper surface 141 and the lower surface 142 or a portion of the upper surface 141 and the lower surface 142, which has at least the protrusion portion 150, may be inclined so as to be gradually away from the cross section CS of the cutting insert 140 from the fourth peripheral side surface 146 toward the second peripheral side surface 144. Alternatively, the upper surface 141 and the lower surface 142 of the cutting insert 140 may be parallel with the cross section CS of the cutting insert 140. Further, the upper surface 141 and the lower surface 142 have a concavity 149, which is located inside either edge adjoining the first peripheral side surface 143 or the third peripheral side surface 145. Where the upper surface 141 and the lower surface 142 are inclined with respect to the cross section CS, the concavity 149 is also inclined with respect to the cross section CS. Further, in the cutting insert 140, the cutting edges 147U, which are located at the respective edges of the upper surface 141, and the cutting edges 147L, which are located at the respective edges of the lower surface 142, are inclined with respect to the cross section CS. Specifically, when viewing the first peripheral side surface 143 or the third peripheral side surface 145 of the cutting insert 140 from the side, the cutting edge 147U between the upper surface 141 and the first peripheral side surface 143 or between the upper surface 141 and the third peripheral side surface 145 is downwardly inclined from the fourth peripheral side surface 146 toward the second peripheral side surface 144, and the cutting edge 147L between the lower surface 142 and the first peripheral side surface 143 or between the lower surface 142 and the third peripheral side surface 145 is upwardly inclined from the fourth peripheral side surface 146 toward the second peripheral side surface 144. Thus, during the cutting operation on a workpiece, a cutting force is obliquely applied to the main cutting edge of the cutting insert 140, i.e., the cutting edge 147U, which is located between the upper surface 141 and the first peripheral side surface 143 or between the upper surface 141 and the third peripheral side surface 145 in the radially outward direction ROD of the tool body 110, thereby applying a force to the cutting insert 140 toward the inside of the insert pocket 130. As such, the cutting insert 140 can be stably supported by the insert pocket 130. Moreover, the cutting force can be absorbed through the bottom wall 132 of the insert pocket 130 and the cutting insert 140 can be prevented from being separated from the bottom wall 132 of the insert pocket 130 due to the cutting force.

Referring to FIG. 9, when viewing the first peripheral side surface 143 or the third peripheral side surface 145 of the cutting insert 140 from the side, an interior angle β between the first protrusion surface 153 of the protrusion surface 152, which is provided in the first to fourth protrusion portions 151A, 151B, 151C, 151D, and the second peripheral side surface 144 has an acute angle. Further, referring to FIG. 10, when viewing the cutting insert 140 from the top or the bottom, interior angles γ between the first peripheral side surface 143 and the second peripheral side surface 144 and between the third peripheral side surface 145 and the second peripheral side surface 144 have an obtuse angle. With the aforementioned shape of the cutting insert 140, the cutting insert 140, which is subjected to the pressure force (clamping force) from the elastic pressure portion 115 when mounted to the insert pocket 130, is stably seated on the bottom wall 132 of the insert pocket 130 and is easily guided to the first support wall 133 and the second support wall 134.

Where the cutting insert 140 is formed so as to have the aforementioned interior angles β, γ, the insert pocket 130 receiving the cutting insert 140 also has the shape corresponding to such a shape of the cutting insert 140. Specifically, where the first protrusion surface 153 and the second peripheral side surface 144 of the cutting insert 140 are formed to make an acute angle therebetween, the bottom wall 132 and the second support wall 134 of the insert pocket 130 are formed to make an acute angle therebetween. Further, the bottom wall 132 is inclined in the insert pocket 130 so as to make surface contact with the first protrusion surface 153 of the lower surface 142. Also, the inward inclined surface 136 of the projection portion 135 is inclined in the insert pocket 130 so as to make surface contact with the first inclined surface 156 of the upper surface 141 of the cutting insert 140. Moreover, where the first peripheral side surface 143 and the second peripheral side surface 144 of the cutting insert 140 are formed to make an obtuse angle therebetween, the first support wall 133 and the second support wall 134 of the insert pocket 130 are formed to make an obtuse angle therebetween.

Figure 12:
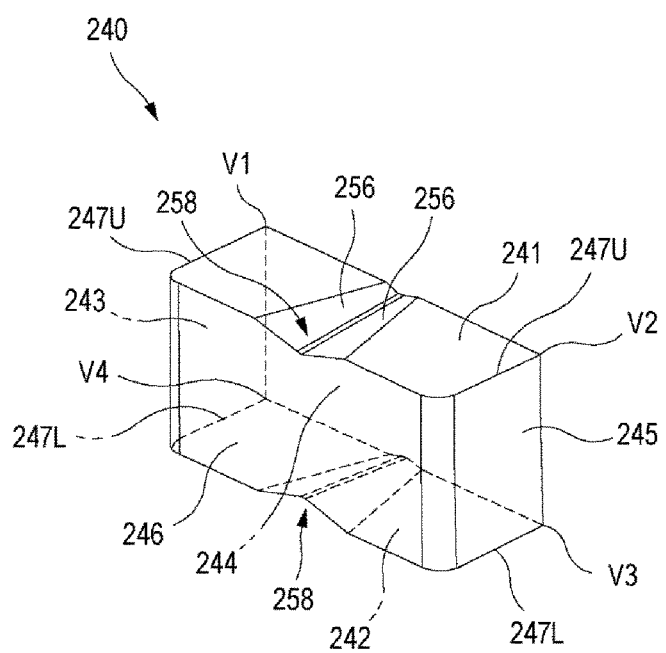
FIG. 12 is a perspective view showing a cutting insert according to another embodiment of the present invention.
Figure 13:
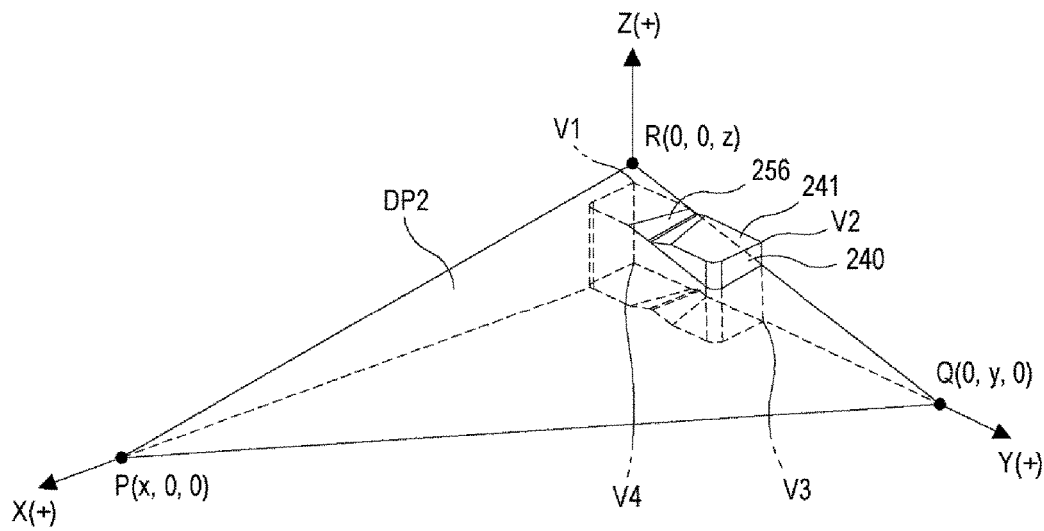
FIG. 13 shows an inclined surface of the cutting insert shown in FIG. 12 by means of an XYZ coordinate system.

In one embodiment, a pair of the protrusion portions (the first and second protrusion portions, and the third and fourth protrusion portions) are provided in each of the upper surface 141 and the lower surface 142, and the opposing contact side surfaces 155 of the pair of the protrusion portions are formed with the first inclined surface 156. However, the cutting insert of the present invention is not limited to the above-described shape. FIG. 12 shows a cutting insert 240 according to a variant embodiment. The cutting insert 240 shown in FIG. 12 does not include the aforementioned pair of the protrusion portions and instead includes an inclined surface 256, which has the same function as the above-described first inclined surface 156, in its top and lower surfaces. Similar to the cutting insert 140 according to one embodiment, the cutting insert 240 includes an upper surface 241, a lower surface 242 and first to fourth peripheral sides surfaces 243, 244, 245, 246. The cutting insert 240 has a rotationally symmetrical shape wherein the cutting insert 240 is rotationally symmetrically by 180° around the central axis CA extending through the centers of the second peripheral side surface 244 and the fourth peripheral side surface 246. The cutting insert 240 includes cutting edges 247U, 247L at the edges between the upper surface 241 and the first peripheral side surface 243, between the upper surface 241 and the third peripheral side surface 243, between the lower surface 242 and the first peripheral side surface 243 and between the lower surface 242 and the third peripheral side surface 245. The cutting insert 240 may have a bore (not shown) passing through the centers of the second peripheral side surface 244 and the fourth peripheral side surface 246. The cutting insert 240 includes an inclined surface portion 258, which is recessed in the middle of each of the upper surface 241 and the lower surface 242. The inclined surface portion 258 extends in the direction of the central axis CA in each of the upper surface 241 and the lower surface 242. When viewing the cutting insert 240 through a longitudinal section, the inclined surface portion 258 has an approximately V-like shape. At the inclined surface portion 258, the cutting insert 240 includes a pair of inclined surfaces 256 which are opposite in the direction orthogonal to the central axis CA (the direction wherein the first peripheral side surface 243 and the third peripheral side surface 245 are opposite). As shown in FIG. 13, when the second peripheral side surface 244 of the cutting insert 240 is positioned in the YZ-plane of the XYZ-coordinate system and the vertex V4, which meets the first peripheral side surface 243 and the lower surface 242 among the four vertexes V1, V2, V3, V4 of the second peripheral side surface 244, is position at the origin of the XYZ-coordinate system, the inclined surface 256 is located in the plane DP2 defined by the three points P, Q, R of the X-axis, Y-axis and Z-axis in the XYZ-coordinate system. In this regard, said three points in the XYZ-coordinate system have the coordinates of P(x, 0, 0), Q(0, y, 0) and R(0, 0, z) respectively, wherein x, y and z has a positive value. That is, similar to the first inclined surface 156 of the cutting insert 140 according to one embodiment, the inclined surface 256 of the cutting insert 240 is inclined with respect to each of the XY-plane, the YZ-plane and the XZ-plane of the XYZ-coordinate system. Thus, the inclined surface 256 of the cutting insert 240 has a normal direction inclined with respect to each of the X-axis, the Y-axis and the Z-axis.

FIGS. 14 to 17 show an example of the cutting portion having the cutting insert and the insert pocket in the rotary cutting tool according to one embodiment. Descriptions are made as to an example wherein the cutting insert 140 is replaceably mounted to the insert pocket 130 formed in the tool body 110 of the rotary cutting tool 100. The cutting insert 240 according to a variant embodiment is also replaceably mounted to the insert pocket 130. Similar to the cutting insert 140 according to one embodiment, the cutting insert 240 is contacted with the inward inclined surface 136 of the projection portion 135 of the insert pocket 130 through the inclined surface 256 and is pressed toward the inside of the insert pocket 130 in three directions.

Figure 14:
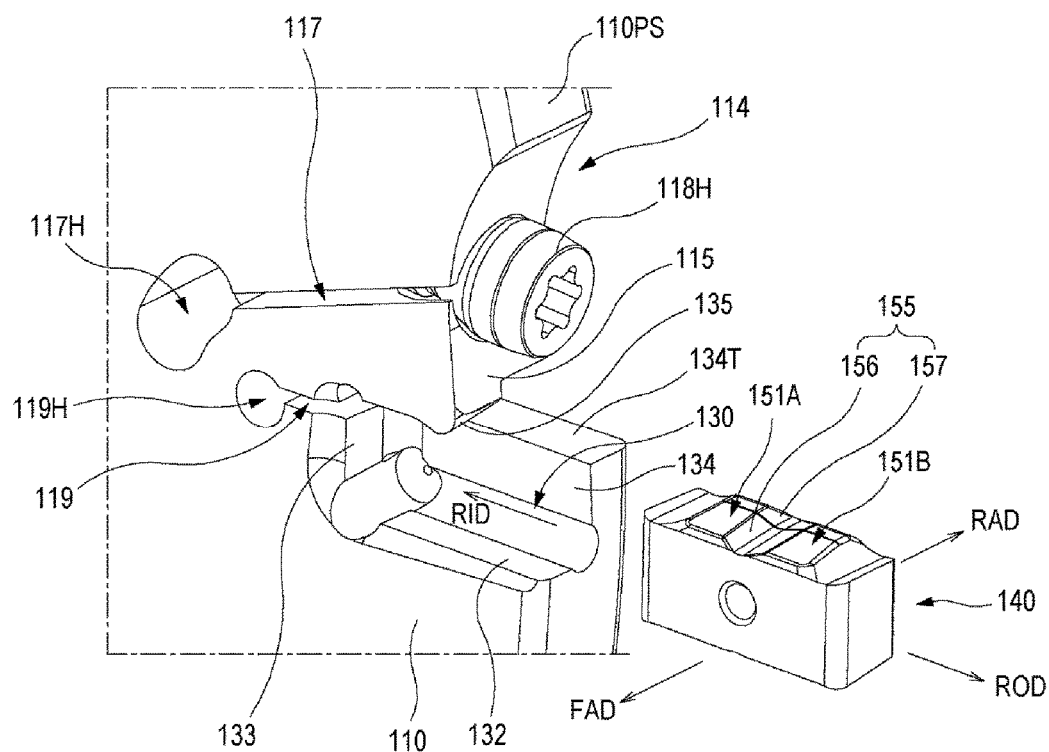
FIG. 14 is a perspective view showing a portion of the rotary cutting tool according to one embodiment of the present invention, showing the insert pocket of the tool body and the cutting insert to be mounted to the insert pocket.
Figure 18:
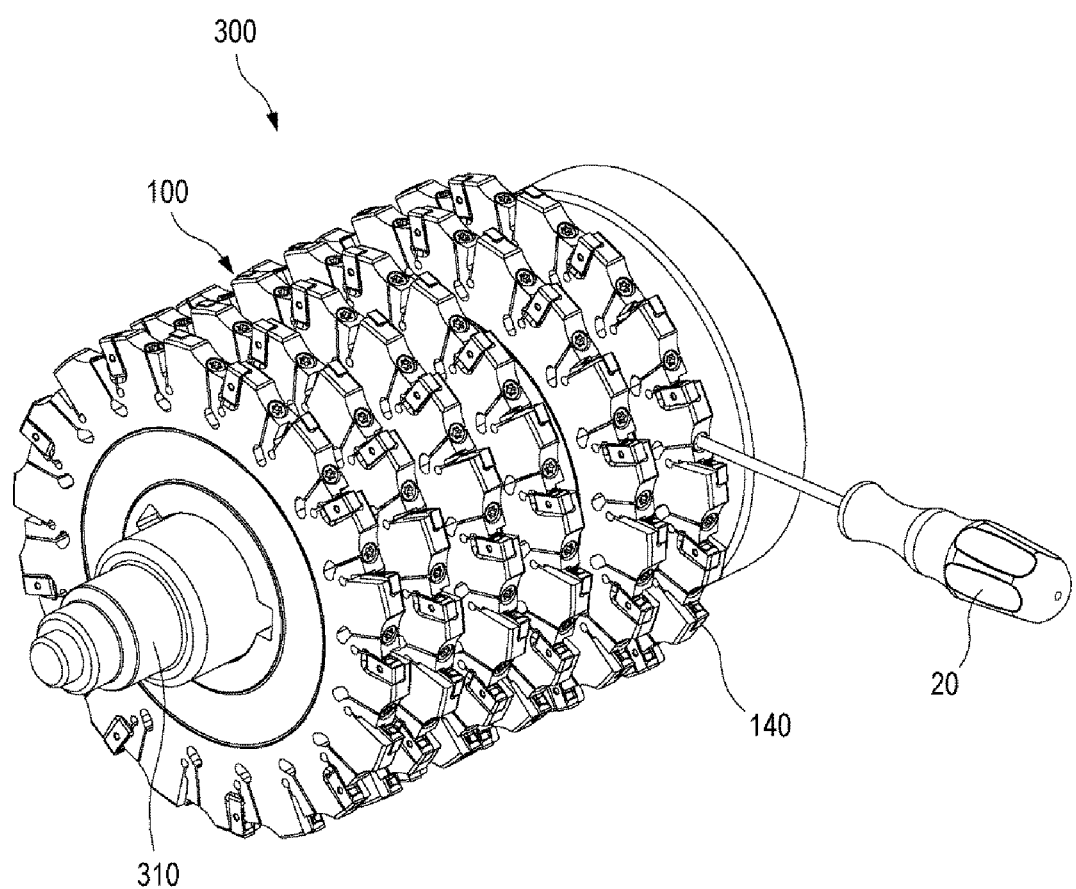
FIG. 18 is a perspective view showing one example of a gang cutter in which the rotary cutting tools according to one embodiment of the present invention are employed.

As shown in FIG. 14, the insert pocket 130 is opened in the tool body 110 in the radially outward direction ROD of the tool body 110 and in one direction of the axial directions (the forward axial direction FAD or the rearward axial direction RAD). The cutting insert 140 may be mounted to the insert pocket 130 by fitting the cutting insert 140 to the insert pocket 130 from the peripheral surface 110PS of the tool body 110, or may be dismounted from the insert pocket 130 by removing the cutting insert 140 from the insert pocket 130 out of the peripheral surface 110PS of the tool body 110. Thus, where a plurality of the rotary cutting tools 100 are combined together and are used as a gang cutter 300 as shown in FIG. 18, the cutting insert 140 can be easily replaced from the rotary cutting tool 100 without disassembling the gang cutter 300. A plurality of the rotary cutting tools 100 are disposed at a rotating shaft 310 of the gang cutter 300 such that the cutting portions of the neighboring rotary cutting tools are arranged in a zigzag or alternate arrangement. Thus, a dispersed cutting force can be applied to the gang cutter 300. Further, by using tangential keys to the rotating shaft 310, a plurality of the rotary cutting tools 100 can be firmly clamped to the rotating shaft 310.

Figure 15:
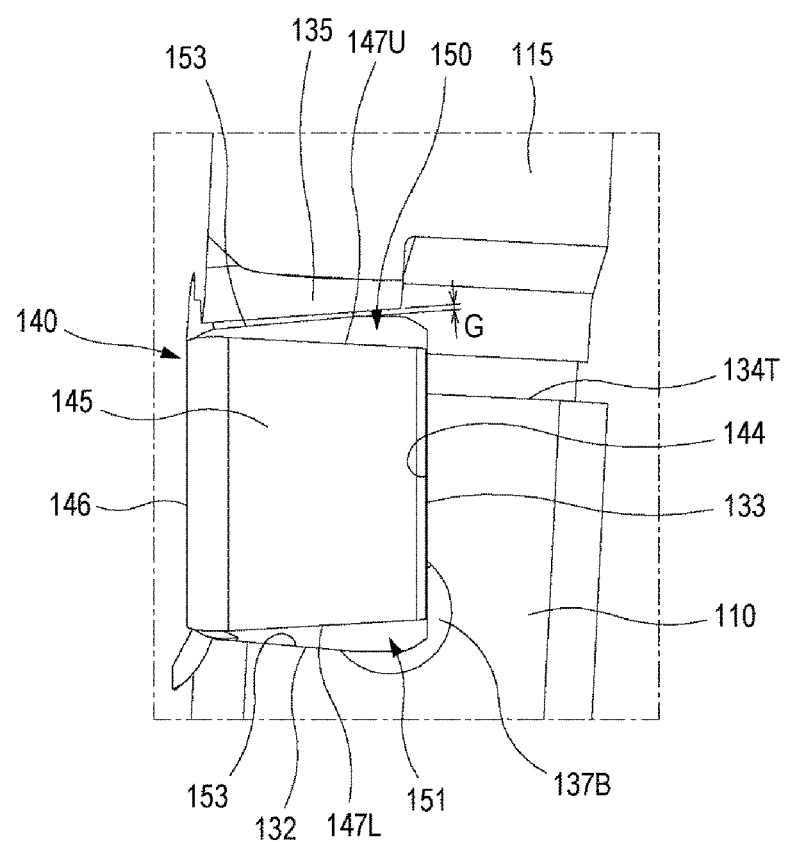
FIG. 15 is a side view showing a portion of the rotary cutting tool according to one embodiment of the present invention, showing the insert pocket of the tool body and the cutting insert received in the insert pocket.

As shown in FIG. 15, the cutting portion 120 of the rotary cutting tool 100 has a clearance gap G between the cutting insert 140 and the insert pocket 130. Thus, when fitting the cutting insert 140 to the insert pocket 130 or removing the cutting insert 140 from the insert pocket 130, the cutting insert 140 is not caught by a portion of the insert pocket 130. That is, the clearance gap G exists between the top wall 131 of the insert pocket 130 and the upper surface of the cutting insert 140 such that the cutting insert 140 can be easily inserted to the insert pocket 130 before the elastic pressure portion 115 is pushed downward, i.e. the projection portion 135 of the top wall 131 of the insert pocket 130 presses the cutting insert 140. In one embodiment, the clearance gap G may be set to the range of 0.1 mm-0.2 mm. If the clearance gap G is less than 0.1 mm, then it is difficult to insert the cutting insert 140 to the insert pocket 130. If the clearance gap G exceeds 0.2 mm, then the elastic pressure portion 115 must be pushed to a relatively great extent such that the projection portion 135 of the top wall 131 can firmly press the cutting insert 140. In such a case, to expand the slot 117 by fastening the adjustment screw 118 to the threaded hole 116, a relatively large force needs to be applied.

Since the cutting insert 140 has the shape having the aforementioned interior angles β, γ, the cutting insert 140 received in the insert pocket 130 is guided to be in close contact with the first support wall 133 and the second support wall 134 of the insert pocket 130. When the cutting insert 140 is received in the insert pocket 130 and is then guided toward the inside of the insert pocket 130, the first protrusion surfaces 153 of the third and fourth protrusion portions 151C, 151D in the lower surface 142 of the cutting insert 140 are contacted with the bottom wall 132, and the second protrusion surfaces 154 of the third and fourth protrusion portions 151C, 151D are not contacted with the bottom wall 132, but is located on the relief groove 137B. Further, the first peripheral side surface 143 and the second peripheral side surface 144 of the cutting insert 140 are contacted with the first support wall 133 and the second support wall 134 of the insert pocket 130, respectively.

Figure 16:
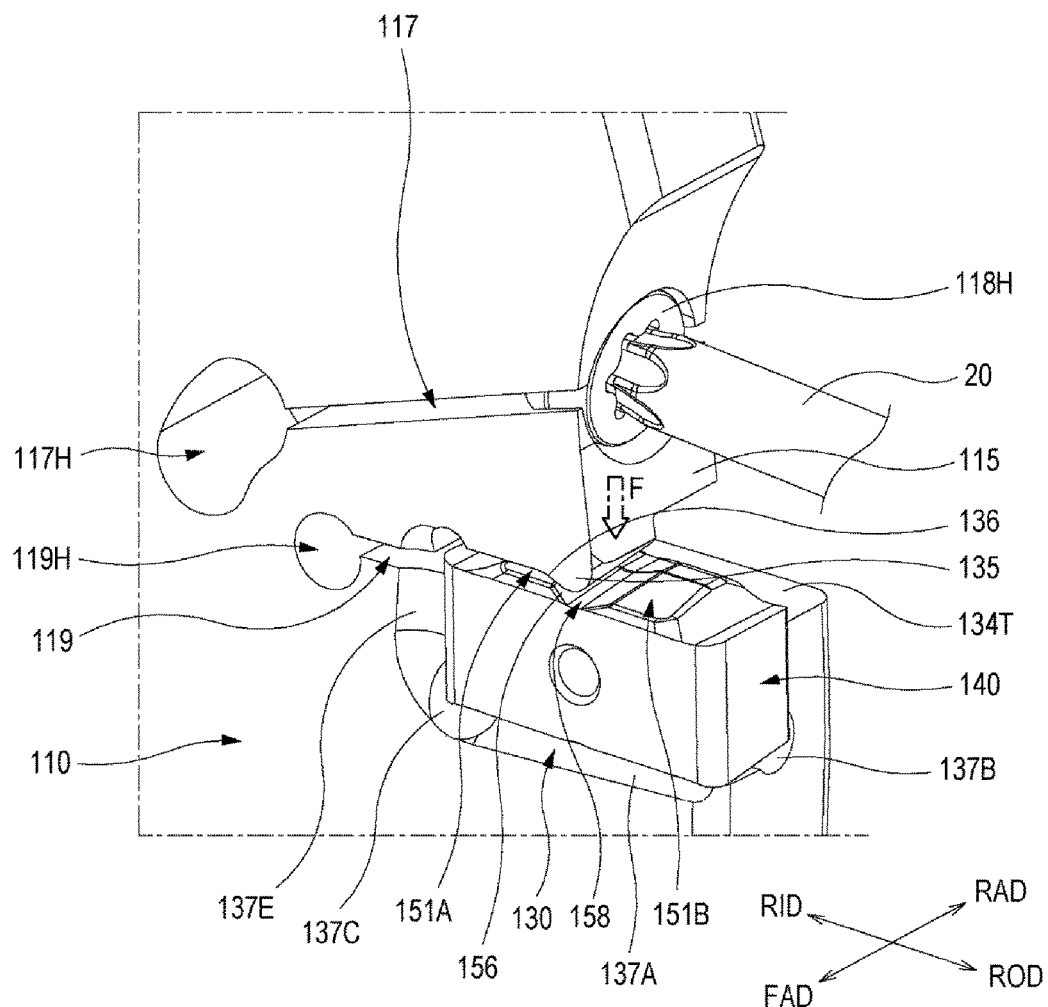
FIG. 16 is a perspective view showing a portion of the rotary cutting tool according to one embodiment of the present invention, showing an example of an action of an elastic pressure portion for pressing the cutting insert to the insert pocket.

As shown in FIG. 16, after the cutting insert 140 is received in the insert pocket 130, the adjustment screw 118 is fitted to the threaded hole 116 and is then fastened by a tool 20 such as a driver. Thereafter, the adjustment screw 118 is moved toward the inside of the tool body 110 while being rotated, and the head portion 118H of the adjustment screw 118 pushes the elastic pressure portion 115 located below the slot 117 and allows the elastic pressure portion 115 to bend.

The elastic pressure portion 115, which is capable of being pushed toward the insert pocket 130 due to the slot 117 and the slit 119 formed in the tool body 110, is subjected to a pressure force F caused by the fastening force of the adjustment screw 118, and is then pushed downward. Thus, the projection portion 135, which is provided in the top wall 131 of the insert pocket 130 (the lower portion or the lower surface of the elastic pressure portion 115), is pushed so as to be contacted with the protrusion portion 150 of the upper surface 141 of the cutting insert 140. The projection portion 135 of the top wall 131 is pushed toward a groove portion 158 between a pair of the protrusion portions 150, i.e. into between the first protrusion portion 151A and the second protrusion portion 151B.

Figure 17:
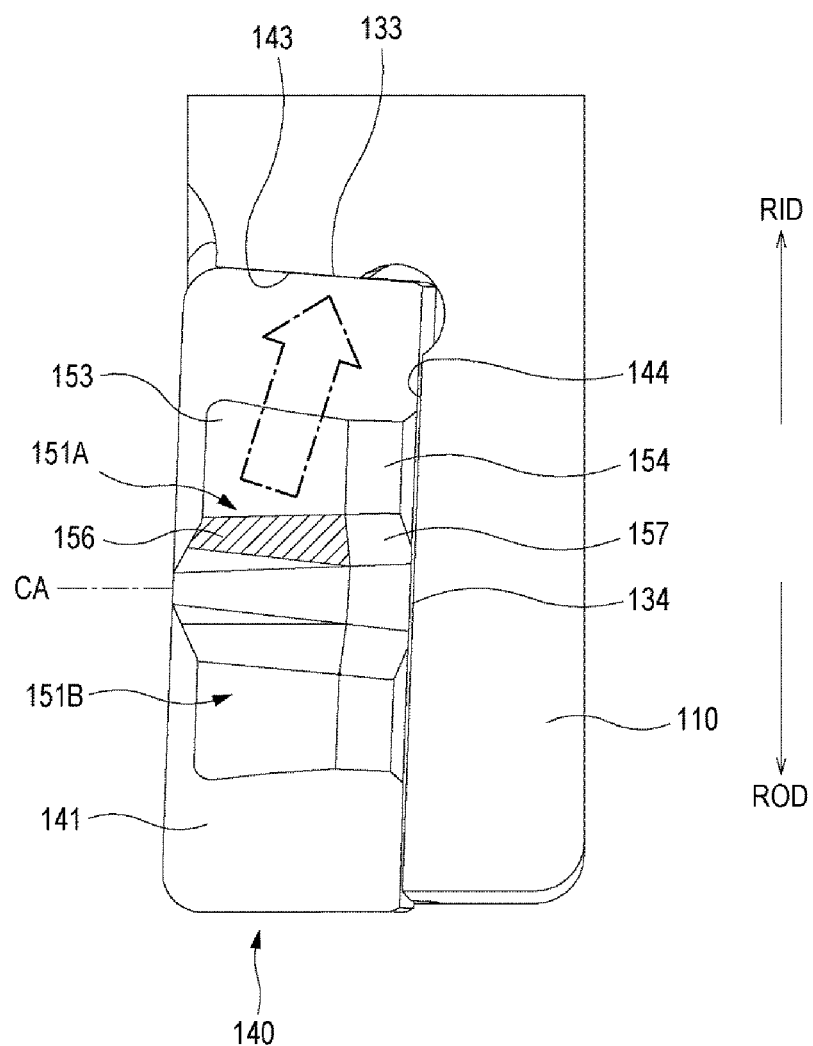
FIG. 17 shows the inclined surface of the cutting insert, which is contacted with a projection portion of the top wall of the insert pocket when the cutting insert is mounted to the insert pocket.

The projection portion 135, which is pushed toward the protrusion portion 150, is contacted with the cutting insert 140 at the inward inclined surface 136. The inward inclined surface 136 of the projection portion 135 is contacted with a portion of the cutting insert 140, which faces toward the inward inclined surface 136. That is, as shown in FIG. 17, the inward inclined surface 136 of the projection portion 135 is contacted with the first inclined surface 156 of the first protrusion portion 151A, which is located in the radially inward direction RID of the tool body 110 among the first and second protrusion portions 151A, 151B. The inward inclined surface 136 of the projection portion 135 may be contacted with a portion of the first inclined surface 156, and the contact area between the inward inclined surface 136 and the first inclined surface 156 may vary depending upon the size of the inward inclined surface 136.

Since the inward inclined surface 136 of the projection portion 135 is in contact with the first inclined surface 156 and the first inclined surface 156 is inclined with respect to the upper surface 141, the cutting insert 140 is pressed in three directions. The three directions, in which the cutting insert 140 is pressed, includes a direction heading to the bottom wall 132 of the insert pocket 130 (a tangential direction), a direction heading to the first support wall 133 of the insert pocket 130 (a radial direction), and a direction heading to the second support wall 134 of the insert pocket 130 (an axial direction). Since the cutting insert 140 is pressed in the three directions toward the inside of the insert pocket 130 and is contacted with the insert pocket 130 at four places, the cutting insert 140 is firmly mounted to the insert pocket 130. Thus, without using a clamping screw to be coupled to the insert pocket, the cutting insert 140 is mounted to the insert pocket 130 with a sufficient clamping force. Further, the cutting insert 140 is clamped to the insert pocket 130 without a movement relative to the insert pocket 130 during the cutting operation on a workpiece.

While the present invention has been described hereinbefore with reference to the foregoing embodiments and the examples shown in the accompanying drawings, the present invention should not be limited thereto. It will be apparent to those of ordinary skill in the art that various substitutions, alternations or modifications may be made without departing from the scope of the present invention.

The invention claimed is:

1. A cutting insert comprising an upper surface, a lower surface, and first to fourth peripheral side surfaces extending between the upper surface and the lower surface,
   wherein the cutting insert is replaceably mounted to an insert pocket provided in a tool body of a rotary cutting tool and is pressed by an elastic pressure portion provided in the tool body,
   wherein the first and third peripheral side surfaces are opposite to each other and the second and fourth peripheral side surfaces are opposite to each other,
   wherein each of the upper surface and the lower surface includes an inclined surface pressed by the elastic pressure portion,
   wherein the inclined surface is inclined with respect to a cross section of the cutting insert such that the first peripheral side surface, the second peripheral side surface and the lower surface are contacted with the insert pocket by a pressure of the elastic pressure portion,
   wherein when the second peripheral side surface is positioned in a YZ-plane of an XYZ-coordinate system and a vertex, which meets the first peripheral side surface and the lower surface among four vertexes of the second peripheral side surface, is positioned at the origin of the XYZ-coordinate system, the inclined surface is located in a plane defined by three points of an X-axis, a Y-axis and a Z-axis in the XYZ-coordinate system, and
   wherein the three points have coordinates of P(x, 0, 0), Q(0, y, 0) and R(0, 0, z), respectively, and x, y and z have a positive value.

2. A cutting insert comprising an upper surface, a lower surface, and first to fourth peripheral side surfaces extending between the upper surface and the lower surface,
   wherein the cutting insert is replaceably mounted to an insert pocket provided in a tool body of a rotary cutting tool and is pressed by an elastic pressure portion provided in the tool body,
   wherein the first and third peripheral side surfaces are opposite to each other and the second and fourth peripheral side surfaces are opposite to each other,
   wherein each of the upper surface and the lower surface includes an inclined surface pressed by the elastic pressure portion,
   wherein the inclined surface is inclined with respect to a cross section of the cutting insert such that the first peripheral side surface, the second peripheral side surface and the lower surface are contacted with the insert pocket by a pressure of the elastic pressure portion,
   wherein the upper surface includes first and second protrusion portions which are symmetrically opposite to each other in a direction orthogonal to a central axis passing through centers of the second and fourth peripheral side surfaces,
   wherein the lower surface includes third and fourth protrusion portions which are symmetrically opposite to each other in the direction orthogonal to the central axis,
   wherein each of the first to fourth protrusion portions includes a protrusion surface and a contact side surface slantly connecting with the protrusion surface, and
   wherein the inclined surface is formed at the contact side surface of the first protrusion portion which is located in a radially inward direction of the tool body among the first and second protrusion portions when the cutting insert is mounted to the insert pocket.

3. The cutting insert of claim 2, wherein when the second peripheral side surface is positioned in a YZ-plane of an XYZ-coordinate system and a vertex, which meets the first peripheral side surface and the lower surface among four vertexes of the second peripheral side surface, is positioned at the origin of the XYZ-coordinate system, the inclined surface is located in a plane defined by three points of an X-axis, a Y-axis and a Z-axis in the XYZ-coordinate system, and
   wherein the three points have coordinates of P(x, 0, 0), Q(0, y, 0) and R(0, 0, z), respectively, and x, y and z have a positive value.

4. The cutting insert of claim 2, wherein the cutting insert has a rotationally symmetrical shape, and wherein the cutting insert is rotationally symmetrical around the central axis.

5. The cutting insert of claim 4, further comprising a cutting edge formed at each of edges between the upper surface and the first peripheral side surface, between the upper surface and the third peripheral side surface, between the lower surface and the first peripheral side surface, and between the lower surface and the third peripheral side surface.

6. The cutting insert of claim 5, wherein when viewing the first peripheral side surface or the third peripheral side surface of the cutting insert from side, the cutting edge of the upper surface is inclined downward from the fourth peripheral side surface toward the second peripheral side surface and the cutting edge of the lower surface is inclined upward from the fourth peripheral side surface toward the second peripheral side surface.

7. The cutting insert of claim 2, wherein the protrusion surface includes a first protrusion surface making an acute angle with the second peripheral side surface.

8. A cutting insert comprising an upper surface, a lower surface, and first to fourth peripheral side surfaces extending between the upper surface and the lower surface,
   wherein the cutting insert is replaceably mounted to an insert pocket provided in a tool body of a rotary cutting tool and is pressed by an elastic pressure portion provided in the tool body,
   wherein the first and third peripheral side surfaces are opposite to each other and the second and fourth peripheral side surfaces are opposite to each other,
   wherein each of the upper surface and the lower surface includes an inclined surface pressed by the elastic pressure portion,
   wherein the inclined surface is inclined with respect to a cross section of the cutting insert such that the first peripheral side surface, the second peripheral side surface and the lower surface are contacted with the insert pocket by a pressure of the elastic pressure portion, and
   wherein each of the first and third peripheral side surfaces makes an obtuse angle with the second peripheral side surface.

9. A rotary cutting tool having a tool body including a plurality of cutting portions,
wherein each of the cutting portions comprises:
the cutting insert of claim 1;
an insert pocket on which the cutting insert is mounted; and
an elastic pressure portion adjoining the insert pocket,
wherein the tool body comprises a pair of circular surfaces opposite in a direction of a rotation axis and a peripheral surface extending between the pair of circular surfaces,
wherein the insert pocket comprises:
a top wall including a projection portion, the top wall being configured to be bendable by the elastic pressure portion;
a bottom wall opposite to and spaced from the top wall;
a first support wall located between the top wall and the bottom wall and facing in an radially outward direction of the tool body; and
a second support wall located between the top wall and the bottom wall and facing in an axial direction of the tool body,
wherein the projection portion of the top wall includes an inward inclined surface which presses the inclined surface of the cutting insert such that when the cutting insert is mounted to the insert pocket, the first peripheral side surface, the second peripheral side surface and the lower surface are contacted with the first support wall, the second support wall and the bottom wall, respectively.

10. The rotary cutting tool of claim 9, wherein a lower portion of the elastic pressure portion forms the top wall, and
wherein the elastic pressure portion comprises:
a threaded hole extending from the peripheral surface of the tool body toward an inside of the tool body;
a slot extending at the peripheral surface of the tool body from an entrance of the threaded hole toward the inside of the tool body and being inclined with the threaded hole; and
an adjustment screw coupled to the threaded hole to expand the slot.

11. The rotary cutting tool of claim 9, wherein a lower portion of the elastic pressure portion forms the top wall, and
wherein the elastic pressure portion comprises:
a wedge hole extending from the peripheral surface of the tool body toward an inside of the tool body;
a slot extending at the peripheral surface of the tool body from an entrance of the wedge hole toward the inside of the tool body and being inclined with respect to the wedge hole;
a wedge block inserted to the wedge hole; and
an adjustment screw fitted to the wedge block and coupled to the wedge hole to expand the slot.

12. The rotary cutting tool of claim 10, wherein the tool body includes a slit extending from the insert pocket toward the inside of the tool body, the slit being inclined with respect to the slot.

13. The rotary cutting tool of claim 9, wherein the bottom wall and the second support wall make an acute angle therebetween in the insert pocket.

14. The rotary cutting tool of claim 9, wherein the first support wall and the second support wall make an obtuse angle therebetween in the insert pocket.

15. The rotary cutting tool of claim 9, wherein each of the cutting portions has a clearance gap of 0.1 mm to 0.2 mm between the top wall of the insert pocket and the upper surface of the cutting insert.

16. The rotary cutting tool of claim 9, wherein the tool body has a disk shape formed with a shaft hole having a pair of key ways at a center of the disk shape.

17. The rotary cutting tool of claim 9, wherein the plurality of cutting portions comprises left-handed cutting portions and right-handed cutting portions which are alternately arranged along a circumferential periphery of the tool body.

18. The rotary cutting tool of claim 9, wherein the rotary cutting tool is a side milling cutter for forming a slot in a workpiece.

19. The cutting insert of claim 8, wherein when the second peripheral side surface is positioned in a YZ-plane of an XYZ-coordinate system and a vertex, which meets the first peripheral side surface and the lower surface among four vertexes of the second peripheral side surface, is positioned at the origin of the XYZ-coordinate system, the inclined surface is located in a plane defined by three points of an X-axis, a Y-axis and a Z-axis in the XYZ-coordinate system, and
wherein the three points have coordinates of P(x, 0, 0), Q(0, y, 0) and R(0, 0, z), respectively, and x, y and z have a positive value.

* * * * *